US010160116B2

(12) United States Patent
Li et al.

(10) Patent No.: US 10,160,116 B2
(45) Date of Patent: Dec. 25, 2018

(54) METHOD FOR CALIBRATING TOOL CENTRE POINT FOR INDUSTRIAL ROBOT SYSTEM

(71) Applicant: ABB Schweiz AG, Baden (CH)

(72) Inventors: Jinsong Li, Beijing (CN); Hao Gu, Shanghai (CN); Yonglin Chi, Shanghai (CN); Yan Xu, Shanghai (CN)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/251,366

(22) Filed: Aug. 30, 2016

(65) Prior Publication Data

US 2016/0368147 A1  Dec. 22, 2016

Related U.S. Application Data

(63) Continuation of application No. PCT/CN2014/076578, filed on Apr. 30, 2014.

(51) Int. Cl.
 B25J 9/00 (2006.01)
 B25J 9/16 (2006.01)
(52) U.S. Cl.
 CPC ... *B25J 9/1692* (2013.01); *G05B 2219/39025* (2013.01)
(58) Field of Classification Search
 CPC ......... B25J 9/1692; G05B 2219/39025; G05B 2219/40624

(Continued)

(56) References Cited

U.S. PATENT DOCUMENTS 4,969,108 A * 11/1990 Webb ..................... B25J 9/1684
 219/124.34
5,457,367 A * 10/1995 Thorne .................. B25J 9/1692
 318/568.11

(Continued)

FOREIGN PATENT DOCUMENTS

CN  1867430 A  11/2006
CN  103115629 A  5/2013

(Continued)

OTHER PUBLICATIONS

State Intellectual Property of the P.R. China, International Search Report & Written Opinion issued in corresponding Application No. PCT/CN2014/076678, dated Feb. 6, 2015, 8 pp.

(Continued)

*Primary Examiner* — Jonathan L Sample
(74) *Attorney, Agent, or Firm* — Taft Stettinius & Hollister LLP

(57) ABSTRACT

A method is disclosed for calibrating a tool center point of tool for an industrial robot system. The method can include moving a first part of said tool and a cross beam sensor by said industrial robot; recording a first posture and a second posture of said industrial robot during the interruptions of a first beam and a second beam of a cross beam sensor; moving a second part of said tool and said cross beam sensor by said industrial robot; recording a third posture and a fourth posture of said industrial robot; calculating the tool orientation in consideration of said first posture, second posture, third posture and fourth posture of said industrial robot; and moving said tool and said cross beam sensor by said industrial robot so that said tool center point of said tool interrupts said crossing point of said cross beam sensor.

20 Claims, 3 Drawing Sheets

(58) Field of Classification Search
USPC .................................................. 700/245–264
See application file for complete search history.

(56) References Cited

U.S. PATENT DOCUMENTS

| | | | | |
|---|---|---|---|---|
| 5,727,132 | A * | 3/1998 | Arimatsu | G05B 19/4083 700/259 |
| 5,910,719 | A * | 6/1999 | Thorne | B25J 9/1692 318/560 |
| 5,987,591 | A * | 11/1999 | Jyumonji | B25J 9/1697 700/259 |
| 6,044,308 | A * | 3/2000 | Huissoon | B25J 9/1692 700/166 |
| 6,151,109 | A * | 11/2000 | Bromssen | B23K 26/04 219/121.83 |
| 6,292,715 | B1 * | 9/2001 | Rongo | B25J 9/1664 318/568.1 |
| 6,356,808 | B1 * | 3/2002 | Stenberg | B25J 9/1692 318/568.1 |
| 6,430,472 | B1 * | 8/2002 | Boillot | G05B 19/056 219/121.61 |
| 6,434,449 | B1 * | 8/2002 | De Smet | B25J 9/1692 318/568.1 |
| 6,615,112 | B1 * | 9/2003 | Roos | B25J 9/1692 318/568.1 |
| 7,161,321 | B2 * | 1/2007 | Ban | B25J 9/1692 318/560 |
| 7,298,385 | B2 * | 11/2007 | Kazi | B25J 9/1671 345/633 |
| 7,684,898 | B2 * | 3/2010 | Pagel | B25J 9/1692 700/166 |
| 8,180,487 | B1 * | 5/2012 | Vangal-Ramamurthy | B25J 9/1692 219/121.78 |
| 8,406,922 | B2 * | 3/2013 | Nemmers | B25J 9/1692 700/182 |
| 8,485,017 | B1 * | 7/2013 | Trompeter | B25J 9/1692 73/1.79 |
| 2005/0107920 | A1 * | 5/2005 | Ban | B25J 9/1692 700/245 |
| 2005/0225278 | A1 * | 10/2005 | Ban | B25J 9/1692 318/568.11 |
| 2005/0273199 | A1 * | 12/2005 | Ban | B25J 9/1682 700/248 |
| 2006/0152533 | A1 * | 7/2006 | Read | B25J 9/1671 345/653 |
| 2006/0192514 | A1 * | 8/2006 | Adachi | H01L 21/67259 318/568.13 |
| 2008/0234863 | A1 * | 9/2008 | Pagel | B25J 9/1692 700/254 |
| 2008/0252248 | A1 * | 10/2008 | Lundberg | B25J 9/1692 318/572 |
| 2008/0300723 | A1 * | 12/2008 | Ban | B25J 9/1692 700/259 |
| 2009/0003975 | A1 * | 1/2009 | Kuduvalli | A61N 5/1049 414/146 |
| 2009/0118864 | A1 * | 5/2009 | Eldridge | B25J 9/1692 700/259 |
| 2009/0145888 | A1 * | 6/2009 | Hesse | B23K 26/04 219/121.64 |
| 2009/0240372 | A1 * | 9/2009 | Bordyn | B25J 9/1692 700/259 |
| 2010/0262288 | A1 * | 10/2010 | Svensson | B25J 9/1671 700/254 |
| 2011/0029131 | A1 * | 2/2011 | Ban | B25J 9/1697 700/254 |
| 2011/0029132 | A1 * | 2/2011 | Nemmers | B25J 9/1692 700/254 |
| 2012/0265341 | A1 * | 10/2012 | Trompeter | B25J 9/1692 700/254 |
| 2013/0035791 | A1 * | 2/2013 | Chiu | B25J 9/1692 700/253 |
| 2013/0123982 | A1 * | 5/2013 | Chiu | B25J 9/1692 700/254 |
| 2014/0144895 | A1 * | 5/2014 | Stork Genannt Wersborg | B23K 26/046 219/121.75 |
| 2014/0347655 | A1 * | 11/2014 | Jurca | G01M 11/0207 356/125 |
| 2014/0365006 | A1 * | 12/2014 | Trompeter | B25J 9/1692 700/254 |
| 2014/0365007 | A1 * | 12/2014 | Trompeter | B25J 9/1692 700/254 |
| 2015/0158180 | A1 * | 6/2015 | Trompeter | B25J 9/1692 700/254 |
| 2015/0306769 | A1 * | 10/2015 | Trompeter | B25J 9/1692 700/98 |
| 2016/0016317 | A1 * | 1/2016 | Trompeter | B25J 9/1692 700/254 |
| 2016/0184994 | A1 * | 6/2016 | Trompeter | B25J 9/1692 700/254 |
| 2017/0010094 | A1 * | 1/2017 | Iseli | G01B 5/008 |
| 2017/0066131 | A1 * | 3/2017 | Kamikawa | B25J 9/1692 |

FOREIGN PATENT DOCUMENTS

| | | |
|---|---|---|
| DE | 102007020604 A1 | 11/2008 |
| WO | 2006/055770 A2 | 5/2006 |
| WO | 212/125209 A2 | 9/2012 |

OTHER PUBLICATIONS

Extended European Search Report dated Feb. 26, 2018 in corresponding European application No. 14890545.8 (11 pages).
Gu et al., Quick Robot Cell Calibration for Small Part Assembly, Proceedings of 2015 IFToMM World Congress, Oct. 25-30, 2015, Taipei, Taiwan (6 pages).
Technical reference manual, RAPID Instructions, Functions and Data types, ABB Robotics, dated Apr. 3, 2013 (1336 pages).
Technical reference manual, RAPID overview, ABB Robotics, dated Sep. 29, 2012 (168 pages).
Development of an Automatic Robot Assembly System for Small Products, In: Proceeding of 2nd IFToMM International Symposium on Robotics and Mechatronics, ISRM2011, 2011.
Chinese Office Action, Chinese Patent Application No. 201480077815.8, dated Aug. 2, 2016, 13 pages including machine translation in English.
Chinese Search Report, Chinese Patent Application No. 201460077615.8, dated Aug. 2, 2018, 4 pages including machine translation in English.

* cited by examiner

METHOD FOR CALIBRATING TOOL CENTRE POINT FOR INDUSTRIAL ROBOT SYSTEM

TECHNICAL FIELD

The invention relates to a method for calibrating a tool centre point, and more particularly to calibrating a tool centre point for an industrial robot system.

BACKGROUND ART

Calibration is the typical way to ensure the position accuracy between the industrial robot and its tool or between the industrial robot and its work object in the industrial robot cell. In particular, the tool and the work object may be defined with inaccurate kinematical data. So that, a good calibration makes it possible to align the off-line program with the on-line, and it can also recover the cell once the relative position between robot and the tool or the work object gets changed.

Currently, manual cell calibration by the field engineer is relatively time-consuming and inaccurate. For high accuracy demanded applications, it can easily take days' effort for a cell commissioning or recovery on customer site.

U.S. Pat. No. 7,684,898 describes a method for calibration of a working point (TCP) for tools on industrial robots with a calibration device includes the use of at least two light barriers with an azimuth angle greater than zero at an angle to each other and intersecting at an intersection point. The method includes fixing set TCP positional coordinates for a set working point for the tool, relative to a tool reference point and a TCP coordinate system relative to the working point, moving the tool to the set working point with relation to the TCP coordinate system through the light barriers, such that the tool tip interrupts the light barriers, recording actual TCP positional coordinates determining the difference between the set TCP positional coordinates for the interruption of the light barriers for a set working point and the corresponding recorded actual TCP positional coordinates for the actual working point, calculating the actual working point from the set working point for the number of levels of light barriers from the differences and the known position and azimuth angles (a) of the light barriers. This calibration method requires the knowledge of the position and azimuth angles of the light barriers, however this method requires a pre-defined tool data and can only work with one posture without covering post inaccuracy introduced by the manipulator.

BRIEF SUMMARY OF THE INVENTION

According to an aspect of present invention, it provides A method for calibrating a tool centre point of tool for an industrial robot system comprising a cross beam sensor that has a first beam and a second beam which are angled to each other with a vertex angle greater than zero and cross each other at a crossing point, including: (a) relatively moving a first part of said tool and a cross beam sensor by said industrial robot with translational motion in an orientation so that said first part of said tool respectively interrupts said first beam and said second beam of said cross beam sensor; (b) recording a first posture and a second posture of said industrial robot during the interruptions of said first beam and said second beam of said cross beam sensor by said first part of said tool; (c) relatively moving a second part of said tool and said cross beam sensor by said industrial robot with translational motion in said orientation so that said second part of said tool respectively interrupts said first beam and said second beam of said cross beam sensor; (d) recording a third posture and a fourth posture of said industrial robot during the interruptions of said first beam and said second beam of said cross beam sensor by said second part of said tool; (e) calculating the tool orientation in consideration of said first posture, second posture, third posture and fourth posture of said industrial robot as well as said first beam direction and said second beam direction; and (f) relatively moving said tool and said cross beam sensor by said industrial robot so that said tool centre point of said tool interrupts said crossing point of said cross beam sensor in consideration of said tool orientation and either the first and the second postures or the third and the fourth postures of said industrial robot.

According to another aspect of present invention, it provides a method for calibrating a tool centre point of tool for an industrial robot system comprising a cross beam sensor that has a first beam and a second beam which are angled to each other with a vertex angle greater than zero and cross each other at a crossing point, including: (a) relatively moving a first part of said tool and a cross beam sensor by said industrial robot with translational motion in an orientation so that said first part of said tool interrupts said first beam of said cross beam sensor, moves along the first beam direction from the interruption point, and interrupts said second beam of said cross beam sensor at said crossing point of said cross beam sensor; (b) recording a second posture of said industrial robot where said first part of said tool interrupts said second beam of said cross beam sensor at said crossing point of said cross beam sensor; (c) relatively moving a second part of said tool and said cross beam sensor by said industrial robot with translational motion in said orientation so that said second part of said tool interrupts said first/second beam of said cross beam sensor, moves along the first/second beam direction from the interruption point, and interrupts said second/first beam of said cross beam sensor at said crossing point of said cross beam sensor; (d) recording a fourth posture of said industrial robot where said second part of said tool interrupts said second beam of said cross beam sensor at said crossing point of said cross beam sensor; (e) calculating the tool orientation in consideration of said second posture and said fourth posture of said industrial robot; and (f) relatively moving said tool and said cross beam sensor by said industrial robot so that said tool centre point of said tool interrupts said crossing point of said cross beam sensor in consideration of said tool orientation and either the second posture or the fourth posture of said industrial robot.

By using the method as above, upon ignorance of the position of the tool, the industrial robot can guide the cross beam sensor to approach TCP of the tool.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
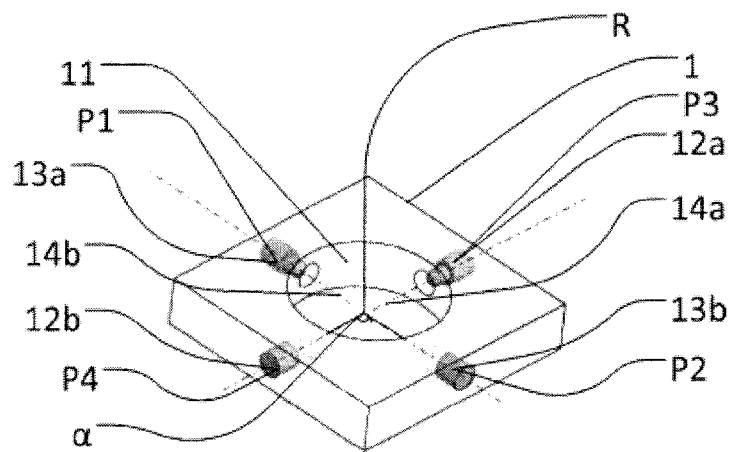
FIG. 1 shows a cross beam sensor according to an embodiment of present invention.

FIG. 1 shows a cross beam sensor according to an embodiment of present invention. The cross beam sensor has at least two optical beams which are angled to one another with a vertex angle greater than zero and cross one another at a crossing point. As shown in FIG. 1, the cross beam sensor 1 has a flat block 10 with a hole 11 through it, and a first transmitter 12a, a first receiver 12b, a second transmitter 13a, a second receiver 13b. The hole 11 has an internal surface shaped like a cylinder or a hexagon. On the sidewall of the internal surface of the hole 11, there are two pairs of positions, for example the first pair of position includes positions P1, P2, and the second pair of positions includes positions P3, P4. The first transmitter 12a, the first receiver 12b, the second transmitter 13a, and the second receiver 13b are respectively fixed on the positions P1, P2, P3, and P4 so that a first beam 14a sent by the first transmitter 12a can arrive at the first receiver 12b, and a second beam 14b sent by the second transmitter 13a can arrive at the second receiver 13b, and the first beam 14a and the second beam 14b are aligned diagonally thereto; the first beam 14a and the second beam 14b run up to one another at a vertex angel alpha greater than zero, for example 90 degrees and meet at a crossing point R in the interspace between the beams 14a, 14b. This results in the creation of a fork light beam that is preferably designed as an infrared light beam. The cross beam sensor 1 can be mounted in a stationary fashion in the cell of an industrial robot.

A tool center point (TCP) of a tool for an industrial robot, for example, the tool tip, is moved for the purpose of calibrating the tool center point TCP so as to approach the crossing point R of the cross beam sensor 1. In this case, both of the first beam 14a and the second beam 14b are interrupted by the tool tip such that a switching signal is generated.

The calibration method is explained in more detail below.

Figure 2A:
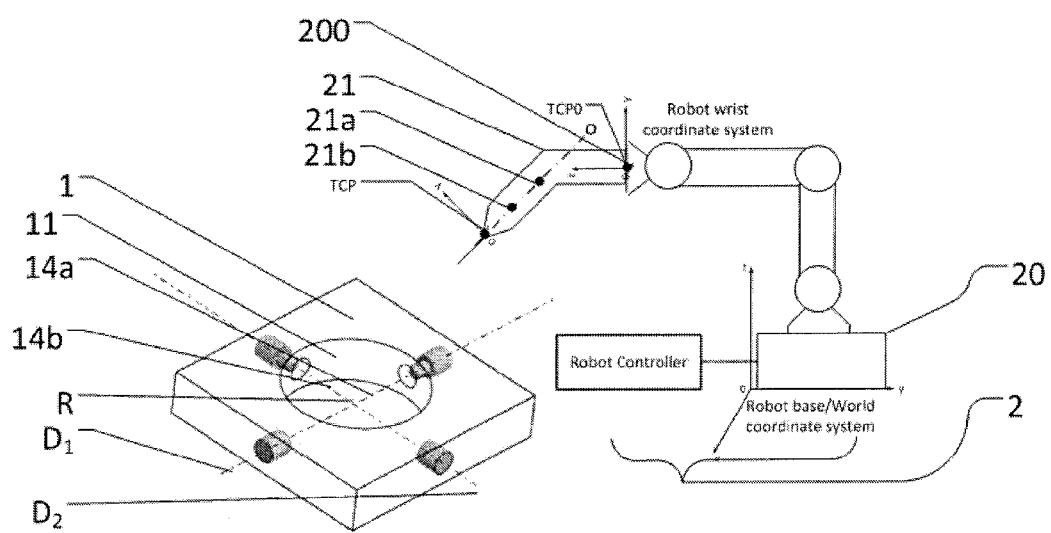
FIGS. 2A and 2B respectively show an industrial robot system for calibrating a tool center point according to embodiments of present invention concerning scenarios A and B.
Figure 2B:
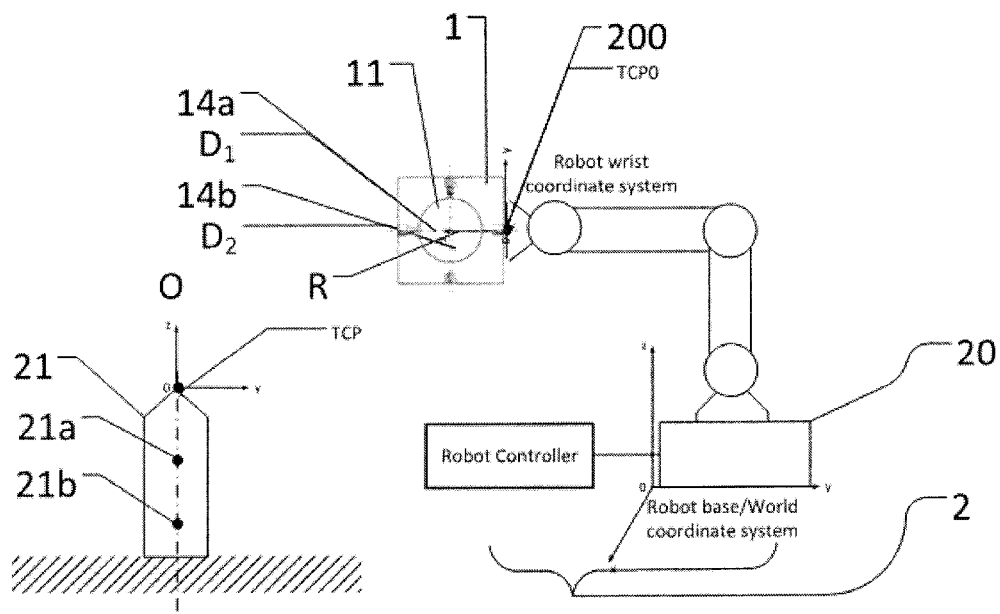

FIGS. 2A and 2B respectively show an industrial robot system for calibrating a tool centre point according to embodiments of present invention concerning scenarios A and B. The industrial robot system 2 includes an industrial robot 20, a tool 21, and the cross beam sensor 1. Tool calibration is to identify the pose of the tool 21 with respect to a part of the industrial robot 20, for example its wrist 200. In particular, there are two typical robot working scenarios: A. with moving tool held by the industrial robot, and B. with stationary tool in the industrial robot cell, which will be described separately as below.

Scenario A

As shown in FIG. 2A, the tool 21 is held by the industrial robot 20 (for example attached to a wrist of the industrial robot), and the cross beam sensor 1 is mounted in the industrial robot cell in a stationary fashion. The tool calibration for scenario A is to identify the fixed relative pose of the tool 21 with respect to the wrist 200 of the industrial robot 20.

The TCP four-point calibration is done by moving the robot making the TCP point against a fixed point in a surrounding to the industrial robot. The fixed point is for instance the tip of a nail. By moving the industrial robot, making the TCP point against the tip of the fixed point from at least four different orientations, the coordinate of the TCP in relation to the robot base coordinate/world coordinate system is calculated. This is done by formulating a least squares optimization problem by insisting that if the correct coordinates of the TCP pointer are found, then the sum of the squared variations in the calculated location of the fixed pointer is minimal, ideally zero, but allowing for a small residual error due to inaccuracies in motions and robot kinematics. Following the requirements of four-point algorithm, in particular considering identification of the space relationship between the part of industrial robot 20 and the tool 21, the industrial robot 20 needs to make relative movement between the tool 21 and the cross beam sensor 1 so that the tool centre point of the tool 21 can approach the crossing point R of the cross beam sensor 1.

In order to guide the TCP to the crossing point R under scenario A, a method for calibrating a tool center point for an industrial robot system according to an embodiment of present invention is described thereafter. In step (a) the industrial robot 20 holds the tool 21 and relatively move a first part 21a of the tool 21 and the cross beam sensor 1 with translational motion in an orientation O so that the first part 21a of the tool 21 respectively interrupts the first beam 14a and the second beam 14b of the cross beam sensor 1. In particular, upon interruption of the first beam 14a, the cross beam sensor 1 sends a first signal to the industrial robot system 2 representing that the interruption of the first beam 14a occurs, and upon interruption of the second beam 14b, the cross beam sensor 1 sends a second signal to the industrial robot system 2 representing that the interruption of the second beam 14b occurs; the characteristic of translational movement renders the tool 21 retains the same orientation when it moves relatively to the cross beam sensor 1 and the first part 21 of the tool 21 interrupts the first beam 14a and the second beam 14b in the plane defined by the two beams.

Step (b) records a first posture and a second posture of the industrial robot 20 during the interruptions of the first beam 14a and the second beam 14b of the cross beam sensor 1 by the first part 21a of the tool 21. In particular, upon the interruption of the first beam 14a, it records the first posture of the industrial robot 20 from which the coordinates for any part of the industrial robot 20 can be calculated according to various coordinate system, for example the coordinates of TCP0 representing the position of the industrial robot wrist 200 with respect to the industrial robot base coordinate system/world coordinate system; the second posture of the industrial robot 20 is also recorded upon interruption of the second beam 14b by the first part 21a of the tool 21. Given the first posture and the second posture of the industrial robot 20 and the first beam direction $D_1$ and the second beam direction $D_2$, the posture of the industrial robot 20 for the first part 21a of the tool 21 intersecting with the intersecting point R of the first beam 14a and the second beam 14b of the cross beam sensor 1 can be solved. The first beam direction $D_1$ and the second beam direction $D_2$ can be represented with respect to the robot base coordinate/world coordinate system. In particular, this said posture of the industrial robot 20 is the coordinates of TCP0 representing the position of the industrial robot wrist 200 with respect to the industrial robot base coordinate system/world coordinate system and denoted as $TCP0_1$.

In step (c) the industrial robot 20 holds the tool 21 and relatively move a second part 21b of the tool 21 and the cross beam sensor 1 with translational motion in the same orientation O as used in step (a) so that the second part 21b of the tool 21 respectively interrupts the first beam 14a and the second beam 14b of the cross beam sensor 1. In particular, upon interruption of the second beam 14a, the cross beam sensor 1 sends a third signal to the industrial robot system 2 representing that the interruption of the first beam 14a occurs, and upon interruption of the second beam 14b, the cross beam sensor 1 sends a fourth signal to the industrial robot system 2 representing that the interruption of the second beam 14b occurs; the characteristic of translational movement renders the tool 21 retains the same orientation when it moves relatively to the cross beam sensor 1 and the first part 21 of the tool 21 interrupts the first beam 14a and the second beam 14b in the plane defined by the two beams.

Step (d) records a third posture and a fourth posture of the industrial robot 20 during the interruptions of the first beam 14a and the second beam 14b of the cross beam sensor 1 by the second part 21b of the tool 21. In particular, upon the interruption of the first beam 14a, it records the third posture of the industrial robot 20 from which the coordinates for any part of the industrial robot 20 can be calculated according to various coordinate system by using known industrial robot kinematics, for example the coordinates for representing the position of the industrial robot wrist with respect to the industrial robot base coordinate system/world coordinate system; the fourth posture of the industrial robot 20 is also recorded upon interruption of the second beam 14b by the second part 21b of the tool 21. Given the third posture and the fourth posture of the industrial robot 20 and the first beam direction $D_1$ and the second beam direction $D_2$, the posture of the industrial robot 20 for the second part 21b of the tool 21 intersecting with the intersecting point R of the first beam 14a and the second beam 14b of the cross beam sensor 1 can be solved. The first beam direction $D_1$ and the second beam direction $D_2$ can be represented with respect to the robot base coordinate/world coordinate system. In particular, this said posture of the industrial robot 20 is the coordinates of TCP0 representing the position of the industrial robot wrist 200 with respect to the industrial robot base coordinate system/world coordinate system and denoted as $TCP0_2$.

Step (e) Calculates the Tool Orientation Ω as Below:

The orientation Ω of tool 21 is defined by the first part 21a and second part 21b, wherein the first part 21a and the second part 21b of the tool 21 are separately disposed on a linear portion of the tool 21 which is fixed on the wrist 200 of the industrial robot 20. Given the relative motion of the industrial robot 20 holding the tool 21 and the cross beam sensor 1 is translational and keeps the same orientation in previous steps (a) and (c), by the parallel principle, The orientation Ω of tool 21 is the same as the orientation defined by two TCP0 positions, $TCP0_1$ and $TCP0_2$. Therefore, the tool orientation can be calculated as follow:

$$\Omega = (TCP0_2 - TCP0_1)/|TCP0_2 - TCP0_1|$$

The tool orientation Ω can be represented with respect to the industrial robot wrist coordinate system.

In step (f), the industrial robot 20 holds the tool 21 and relatively moves the tool 21 and the cross beam sensor 1 so that the tool centre point (TCP) of the tool 21 interrupts crossing point R of the first beam 14a and the second beam 14b of the cross beam sensor 1 in consideration of the tool orientation Ω and the posture of said $TCP0_1$ or $TCP0_2$ of the industrial robot 20. For example, in step (f) the industrial robot 20 holds the tool 21 taking the posture of said $TCP0_1$ or $TCP0_2$ and relatively move the tool 21 and the cross beam sensor 1 with translational motion in the same orientation O as used in step (a) with respect to the robot base coordinate/ world coordinate system and in the direction of the tool orientation S2 with respect to the robot base coordinate/ world coordinate system so that the tool centre point of said tool 21 interrupts the crossing point R of the cross beam sensor 1. In particular, when said TCP of said tool 21 is the tip of said tool 21, the ON/OFF status change of both said first signal and said second signal indicates whether the said TCP of said tool 21 is interrupting the crossing point R of the cross beam sensor 1.

Figure 3:
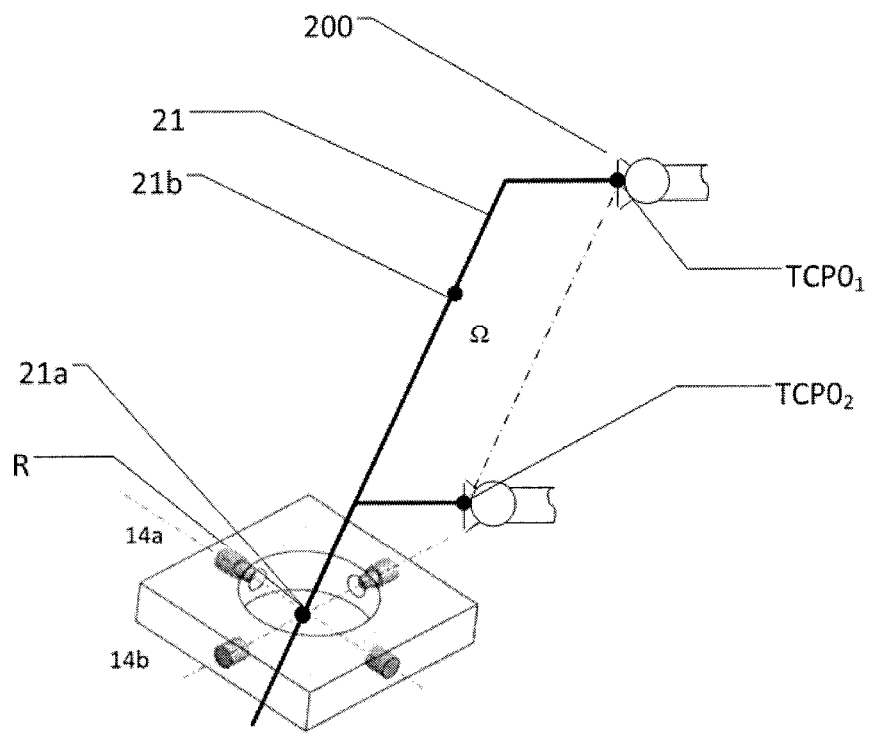
FIG. 3 illustrates approaching the TCP to the crossing point of the cross beam sensor according to an embodiment of present invention.

FIG. 3 illustrates approaching the TCP to the crossing point of the cross beam sensor according to an embodiment of present invention. As shown in FIG. 3, upon ignorance of the position of the crossing point R of the cross beam sensor 1, the industrial robot can guide the TCP of said tool 21 to approach the crossing point R of the cross beam sensor 1.

As an alternative to the method described involving FIGS. 2A and 3, a method for calibrating a tool centre point of tool for an industrial robot system is described thereafter.

In step (a), relatively moving a first part 21a of the tool 21 and a cross beam sensor 1 by the industrial robot 20 with translational motion in an orientation O so that the first part 21a of the tool 21 interrupts the first beam 14a of the cross beam sensor 1, moves along the first beam direction $D_1$ from the interruption point, and interrupts the second beam 14b of the cross beam sensor 1 at the crossing point R of the cross beam sensor 1. In particular, the industrial robot 20 holds the tool 21 and moves the tool 21 relatively to the cross beam sensor 1. Upon interruption of the first beam 14a, the cross beam sensor 1 sends a first signal to the industrial robot system 2 representing that the interruption of the first beam 14a occurs. The characteristic of translational movement renders the tool 21 retains the same orientation when it moves relatively to the cross beam sensor 1.

In step (b), the industrial robot system 2 records a second posture of the industrial robot 20 where the first part 21a of the tool 21 interrupts the second beam 14b of the cross beam sensor 1 at the crossing point R of the cross beam sensor 1. In particular, upon interruption of the second beam 14b, the cross beam sensor 1 sends a second signal to the industrial robot system 2 representing that the interruption of the second beam 14b occurs. The industrial robot system 2 records a second posture of the industrial robot 20 during the interruption of the second beam 14b of the cross beam sensor 1 by the first part 21a of the tool 21. Upon the successful completion of steps (a) and (b), the first part 21a of the tool 21 interrupts crossing point R of the first beam 14a and the second beam 14b of the cross beam sensor 1 and the second posture of the industrial robot 20 becomes known.

In step (c), relatively moving a second part 21b of the tool 21 and a cross beam sensor 1 by the industrial robot 20 with translational motion in the orientation O so that the second part 21b of the tool 21 interrupts the first/second beam 14a/14b of the cross beam sensor 1, moves along the first/second beam direction $D_1/D_2$ from the interruption point, and interrupts the second/first beam 14b/14a of the cross beam sensor 1 at the crossing point R of the cross beam sensor 1. In particular, the industrial robot 20 holds the tool 21 and moves the tool 21 relatively to the cross beam sensor 1. Upon interruption of the first/second beam 14a/14b, the cross beam sensor 1 sends a third signal to the industrial robot system 2 representing that the interruption of the first/second beam 14a/14b occurs. The characteristic of translational movement renders the tool 21 retains the same orientation when it moves relatively to the cross beam sensor 1.

In step (d), the industrial robot system 2 records a fourth posture of the industrial robot 20 where the second part 21b of the tool 21 interrupts the second/first beam 14b/14a of the cross beam sensor 1 at the crossing point R of the cross beam sensor 1. In particular, upon interruption of the second/first beam 14b/14a, the cross beam sensor 1 sends a fourth signal to the industrial robot system 2 representing that the interruption of the second/first beam 14b/14a occurs. The industrial robot system 2 records a fourth posture of the industrial robot 20 during the interruption of the second/first beam 14b/14a of the cross beam sensor 1 by the second part 21b of the tool 21. Upon the successful completion of steps (c) and (d), the second part 21b of the tool 21 interrupts crossing point R of the first beam 14a and the second beam 14b of the cross beam sensor 1 and the four posture of the industrial robot 20 becomes known.

Step (e) calculates the tool orientation $\Omega$ in consideration of the second posture and the fourth posture of the industrial robot 20. In particular, given the relative motion of the industrial robot 20 holding the tool 21 and the cross beam sensor 1 is translational and keeps the same orientation in previous steps, by the parallel principle, the tool orientation defined by the first part 21a and second part 21b is the same as the orientation defined by two TCP0 positions, $TCP0_1$ and $TCP0_2$ when the first part 21a and the second part 21b intersecting with intersecting point R respectively, wherein the first part 21a and the second part 21b of the tool 21 are separately disposed on a linear portion of the tool. Therefore, the tool orientation can be calculated as follow:

$$\Omega=(TCP0_2-TCP0_1)/|TCP0_2-TCP0_1|$$

where $TCP0_1$ is the second posture recorded of the industrial robot 20 in step (b). In particular, as mention above, the coordinates for the industrial robot wrist can be calculated corresponding to the postures of the industrial robot 20.

$TCP0_2$ is the fourth posture recorded of the industrial robot 20 in step (d). In particular, as mention above, the coordinates for the industrial robot wrist can be calculated corresponding to the postures of the industrial robot 20.

Step (f) relatively moves the tool 21 and the cross beam sensor 21 by the industrial robot 20 so that the tool centre point of the tool 21 interrupts the crossing point R of the cross beam sensor 1 in consideration of the tool orientation $\Omega$ and either the second posture or the fourth posture of the industrial robot 20.

The first beam direction $D_1$ and the second beam direction $D_2$ can be predetermined with respect to the robot base coordinate/world coordinate system.

As requested by principle of four-point algorithm, in order to get the TCP position, four sets of coordinates for the same part of the industrial robot 20 are needed for consideration, where the TCP intersects the crossing point R of the cross beam sensor 1 from four different orientations, O1, O2, O3 and O4.

Figure 4:
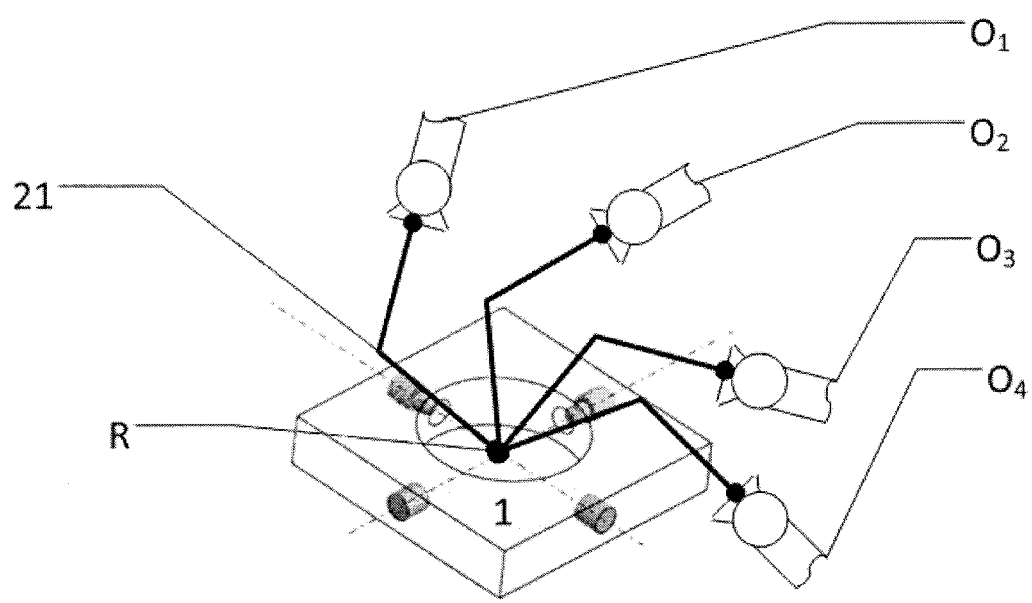
FIG. 4 illustrates that the tool approaches the crossing point of the cross beam sensor in four different orientations.

FIG. 4 illustrates that the tool approaches the crossing point of the cross beam sensor in four different orientations. As shown in FIG. 4, the method for calibration includes four rounds. In particular, as for the first round, steps (a) through (f) are performed where the tool 21 assumes the first orientation O1 of the four different orientations O1, O2, O3 and O4 with respect to the cross beam sensor 1. When the TCP intersects the crossing point R of the cross beam sensor 1, a fifth posture of the industrial robot 20 is recorded from which, as mentioned above, the coordinates for the industrial robot wrist and the tool orientation can be calculated. As for each of the second through fourth rounds, where the tool 21 respectively assumes the second, third, and fourth orientations O2, O3 and O4 of the four different orientations O1, O2, O3 and O4, the tool orientation is inherited from that was calculated in the first round and repeating steps (a), (b), (c), (d) and (f). Similarly, a sixth, a seventh and an eighth posture of the industrial robot 20 are recorded respectively during the interruptions of the crossing point R of the first beam 14a and the second beam 14b of the cross beam sensor 1 by the tool centre point of the tool 21. By reusing the value for the tool orientation, it is helpful for reducing the computation. The outputs from the computation for the four rounds have the fifth, sixth, seventh, and eighth postures of the industrial robot 20, and in consideration of them the tool centre point position of the tool 21 can be calculated by applying principle of four-point calibration.

Scenario B

As shown in FIG. 2B, the tool 21 is fixed in the industrial robot cell and the cross beam sensor 1 is held by the industrial robot 20 (for example, attached to a wrist of the industrial robot). Thus, in more specific, the tool calibration for scenario B is to identify the relative pose of the tool 21 with respect to a stationary point in the industrial robot cell.

Following the requirements of four-point algorithm, in particular considering identification of the space relationship between the part of industrial robot 20 and the tool 21, the industrial robot 20 needs to make relative movement between the tool 21 and the cross beam sensor 1 so that the tool center point of the tool 21 can approach the crossing point R of the cross beam sensor 1.

In order to guide the TCP to the crossing point R under scenario B, a method for calibrating a tool center point for an industrial robot system according to an embodiment of present invention is described thereafter. In step (a) the industrial robot 20 holds the cross beam sensor 1 and relatively move a first part 21a of the tool 21 and the cross beam sensor 1 with translational motion in an orientation O so that the first part 21a of the tool 21 respectively interrupts the first beam 14a and the second beam 14b of the cross beam sensor 1. In particular, upon interruption of the first beam 14a, the cross beam sensor 1 sends a first signal to the industrial robot system 2 representing that the interruption of the first beam 14a occurs, and upon interruption of the second beam 14b, the cross beam sensor 1 sends a second signal to the industrial robot system 2 representing that the interruption of the second beam 14b occurs; the characteristic of translational movement renders the tool 21 retains the same orientation when it moves relatively to the cross beam sensor 1 and the first part 21 of the tool 21 interrupts the first beam 14a and the second beam 14b in the plane defined by the two beams.

Step (b) records a first posture and a second posture of the industrial robot 20 during the interruptions of the first beam 14a and the second beam 14b of the cross beam sensor 1 by the first part 21a of the tool 21. In particular, upon the interruption of the first beam 14a, it records the first posture of the industrial robot 20 from which the coordinates for any part of the industrial robot 20 can be calculated according to various coordinate system, for example the coordinates for representing the position of the industrial robot wrist with respect to the industrial robot base coordinate system/world coordinate system; the second posture of the industrial robot 20 is also recorded upon interruption of the second beam 14b by the first part 21a of the tool 21. Given the first posture and the second posture of the industrial robot 20 and the first beam direction $D_1$ and the second beam direction $D_2$, the posture of the industrial robot 20 for the second part 21a of the tool 21 intersecting with the intersecting point R of the first beam 14a and the second beam 14b of the cross beam sensor 1 can be solved. The first beam direction $D_1$ and the second beam direction $D_2$ can be predetermined and represented with respect to the robot wrist coordinate system. In particular, this said posture of the industrial robot 20 is the coordinates of TCP0 representing the position of the industrial robot wrist 200 with respect to the industrial robot base coordinate system/world coordinate system and denoted as $TCP0_1$. In step (c) the industrial robot 20 holds the cross beam sensor 1 and relatively move a second part 21b of the tool 21 and the cross beam sensor 1 with translational motion in the same orientation O as used in step (a) so that the second part 21b of the tool 21 respectively interrupts the first beam 14a and the second beam 14b of the cross beam sensor 1. In particular, upon interruption of the first beam 14a, the cross beam sensor 1 sends a third signal to the industrial robot system 2 representing that the interruption of the first beam 14a occurs, and upon interruption of the second beam 14b, the cross beam sensor 1 sends a fourth signal to the industrial robot system 2 representing that the interruption of the second beam 14b occurs; the characteristic of translational movement renders the tool 21 retains the same orientation as it moves relatively to the cross beam sensor 1 and the first part 21a of the tool 21 interrupts the first beam 14a and the second beam 14b in the plane defined by the two beams.

Step (d) records a third posture and a fourth posture of the industrial robot 20 during the interruptions of the first beam 14a and the second beam 14b of the cross beam sensor 1 by the second part 21b of the tool 21. In particular, upon the interruption of the first beam 14a, it records the third posture of the industrial robot 20 from which the coordinates for any part of the industrial robot 20 can be calculated according to various coordinate system by using known industrial robot kinematics, for example the coordinates for representing the position of the industrial robot wrist with respect to the industrial robot base coordinate system/world coordinate system; the fourth posture of the industrial robot 20 is also recorded upon interruption of the second beam 14b by the second part 21b of the tool 21. Given the third posture and the fourth posture of the industrial robot 20 and the first beam direction $D_1$ and the second beam direction $D_2$, the posture of the industrial robot 20 for the second part 21b of the tool 21 intersecting with the intersecting point R of the first beam 14a and the second beam 14b of the cross beam sensor 1 can be solved. The first beam direction $D_1$ and the second beam direction $D_2$ can be represented with respect to the robot wrist coordinate system. In particular, this said posture of the industrial robot 20 is the coordinates of TCP0 representing the position of the industrial robot wrist 200 with respect to the industrial robot base coordinate system/ world coordinate system and denoted as $TCP0_2$.

Step (e) Calculates the Tool Orientation $\Omega$

By the parallel principle, the tool orientation defined by the first part 21a and second part 21b is the same as the orientation defined by two TCP0 positions when the first part 21a and second part 21b intersecting with intersecting point R respectively, wherein the first part 21a and the second part 21b of the tool 21 are separately disposed on a linear portion of the tool Therefore, the tool orientation can be calculated as follow:

The orientation $\Omega$ of tool 21 is defined by the first part 21a and second part 21b, wherein the first part 21a and the second part 21b of the tool 21 are separately disposed on a linear portion of the tool 21 which is fixed in the industrial robot cell. Given the relative motion of the industrial robot 20 holding the tool 21 and the cross beam sensor 1 is translational and keeps the same orientation in previous steps (a) and (c), by the parallel principle, The orientation $\Omega$ of tool 21 is the same as the orientation defined by two TCP0 positions, $TCP0_1$ and $TCP0_2$. Therefore, the tool orientation can be calculated as follow:

$$\Omega = (TCP0_2 - TCP0_1)/|TCP0_2 - TCP0_1|$$

The tool orientation $\Omega$ can be represented with respect to the industrial robot base coordinate system/world coordinate system.

In step (f), the industrial robot 20 holds the cross beam sensor 1 and relatively moves the tool 21 and the cross beam sensor 1 so that the tool centre point (TCP) of the tool 21 interrupts crossing point R of the first beam 14a and the second beam 14b of the cross beam sensor 1 in consideration of the tool orientation $\Omega$ and the posture of said $TCP0_1$ or $TCP0_2$ of the industrial robot 20. In step (f) the industrial robot 20 holds the cross beam sensor 1 resuming the posture of said $TCP0_1$ or $TCP0_2$ and relatively move the tool 2 and the cross beam sensor 1 with translational motion in the same orientation O as used in step (a) with respect to the robot base coordinate/world coordinate system and in the direction of the tool orientation 1 with respect to the robot base coordinate/world coordinate system so that the tool centre point of said tool 21 interrupts the crossing point R of the cross beam sensor 1. In particular, when said TCP of said tool 21 is the tip of said tool 21, the ON/OFF status change of both said first signal and said second signal indicates whether the said TCP of said tool 21 is interrupting the crossing point R of the cross beam sensor 1.

Thus, upon ignorance of the position of the tool, the industrial robot can guide the cross beam sensor to approach TCP of the tool.

As an alternative to the method described involving FIG. 2B, a method for calibrating a tool centre point of tool for an industrial robot system is described thereafter.

In step (a), relatively moving a first part 21a of the tool 21 and a cross beam sensor 1 by the industrial robot 20 with translational motion in an orientation O so that the first part 21a of the tool 21 interrupts the first beam 14a of the cross beam sensor 1, moves along the first beam direction $D_1$ from the interruption point, and interrupts the second beam 14b of the cross beam sensor 1 at the crossing point R of the cross beam sensor 1. In particular, the industrial robot 20 holds the cross beam sensor 1 and moves the cross beam sensor 1 relatively to the tool 21. Upon interruption of the first beam 14a, the cross beam sensor 1 sends a first signal to the industrial robot system 2 representing that the interruption of the first beam 14a occurs. The characteristic of translational movement renders the tool 21 retains the same orientation when it moves relatively to the cross beam sensor 1.

In step (b), the industrial robot system 2 records a second posture of the industrial robot 20 where the first part 21a of the tool 21 interrupts the second beam 14b of the cross beam sensor 1 at the crossing point R of the cross beam sensor 1. In particular, upon interruption of the second beam 14b, the cross beam sensor 1 sends a second signal to the industrial robot system 2 representing that the interruption of the second beam 14b occurs. The industrial robot system 2 records a second posture of the industrial robot 20 during the interruption of the second beam 14b of the cross beam sensor 1 by the first part 21a of the tool 21. Upon the successful completion of steps (a) and (b), the first part 21a of the tool 21 interrupts crossing point R of the first beam 14a and the second beam 14b of the cross beam sensor 1 and the second posture of the industrial robot 20 becomes known.

In step (c), relatively moving a second part 21b of the tool 21 and a cross beam sensor 1 by the industrial robot 20 with translational motion in the orientation O so that the second part 21b of the tool 21 interrupts the first/second beam 14a/14b of the cross beam sensor 1, moves along the first/second beam direction $D_1/D_2$ from the interruption point, and interrupts the second/first beam 14b/14a of the cross beam sensor 1 at the crossing point R of the cross beam sensor 1. In particular, the industrial robot 20 holds the cross beam sensor 1 and moves the cross beam sensor 1 relatively to the tool 21. Upon interruption of the first/second beam 14a/14b, the cross beam sensor 1 sends a third signal to the industrial robot 20 representing that the interruption of the first/second beam 14a/14b occurs. The characteristic of translational movement renders the tool 21 retains the same orientation when it moves relatively to the cross beam sensor 1.

In step (d), the industrial robot system 2 records a fourth posture of the industrial robot 20 where the second part 21b of the tool 21 interrupts the second/first beam 14b/14a of the cross beam sensor 1 at the crossing point R of the cross beam sensor 1. In particular, upon interruption of the second/first beam 14b/14a, the cross beam sensor 1 sends a fourth signal to the industrial robot 20 representing that the interruption of the second/first beam 14b/14a occurs. The industrial robot system 2 records a fourth posture of the industrial robot 20 during the interruption of the second/first beam 14b/14a of the cross beam sensor 1 by the second part 21b of the tool 21. Upon the successful completion of steps (c) and (d), the second part 21b of the tool 21 interrupts crossing point R of the first beam 14a and the second beam 14b of the cross beam sensor 1 and the four posture of the industrial robot 20 becomes known.

Step (e) calculates the tool orientation Ω in consideration of the second posture and the fourth posture of the industrial robot 20. In particular, given the relative motion of the industrial robot 20 holding the tool 21 and the cross beam sensor 1 is translational and keeps the same orientation in previous steps, by parallel principle, the tool orientation defined by the first part 21a and second part 21b is the same as the orientation defined by two TCP0 positions, $TCP0_1$ and $TCP0_2$ when the first part 21a and the second part 21b intersecting with intersecting point R respectively, wherein the first part 21a and the second part 21b of the tool 21 are separately disposed on a linear portion of the tool. Therefore, the tool orientation can be calculated as follow:

$$\Omega = (TCP0_2 - TCP0_1)/|TCP0_2 - TCP0_1|$$

where $TCP0_1$ is the second posture recorded of the industrial robot 20 in step (b). In particular, as mention above, the coordinates for the industrial robot wrist can be calculated corresponding to the postures of the industrial robot 20.

$TCP0_2$ is the fourth posture recorded of the industrial robot 20 in step (d). In particular, as mention above, the coordinates for the industrial robot wrist can be calculated corresponding to the postures of the industrial robot 20.

Step (f) relatively moves the tool 21 and the cross beam sensor 21 by the industrial robot 20 so that the tool centre point of the tool 21 interrupts the crossing point R of the cross beam sensor 1 in consideration of the tool orientation Ω and either the second posture or the fourth posture of the industrial robot 20.

As requested by principle of four-point algorithm, in order to get the TCP position, four sets of coordinates for the same part of the industrial robot 20 are needed for consideration, where the TCP intersects the crossing point R of the cross beam sensor 1 from four different orientations, O1, O2, O3 and O4.

The method for calibration includes four rounds. In particular, as for the first round, steps (a) through (f) are performed where the tool 21 assumes the first orientation O1 of the four different orientations O1, O2, O3 and O4 with respect to the cross beam sensor 1. When the TCP interests the crossing point R of the cross beam sensor 1, a fifth posture of the industrial robot 20 is recorded from which, as mentioned above, the coordinates for the industrial robot wrist and the tool orientation can be calculated. As for each of the second through fourth rounds, where the tool 21 respectively assumes the second, third, and fourth orientations O2, O3 and O4 of the four different orientations O1, O2, O3 and O4, the tool orientation is inherited from that was calculated in the first round and repeating steps (a), (b), (c), (d) and (f). Similarly, a sixth, a seventh and an eighth posture of the industrial robot 20 are recorded respectively during the interruptions of the crossing point R of the first beam 14a and the second beam 14b of the cross beam sensor 1 by the tool centre point of the tool 21. By reusing the value for the tool orientation, it is helpful for reducing the computation. The outputs from the computation for the four rounds have the fifth, sixth, seventh, and eighth postures of the industrial robot 20, and in consideration of them the tool centre point position of the tool 21 can be calculated by applying principle of four-point.

According to an embodiment of present invention, each of the first, second, third and fourth postures of the industrial robot 20 is determined by averaging the posture of the respective one at the instant of the interruption of the beam and that at the subsequent release of the beam. As alternative, each of the first, second, third and fourth postures of the industrial robot 20 is determined by averaging the posture of the respective one at the instant of the interruption of the beam from one side and that from the opposite side. A san alternative, each of the first, second, third and fourth postures of the industrial robot 20 is determined by averaging the posture of the respective one at the instant of release of the beam from one side and that from the opposite side.

According to an embodiment of present invention, the tool 21 is a linear-displacement sensor. As an alternative, the tool 21 is a linear-shaped fixture that is mounted on a peripheral of the industrial robot system 2.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for calibrating a tool centre point of a tool for an industrial robot system comprising a cross beam sensor that has a first beam and a second beam which are angled to each other with a vertex angle greater than zero and cross each other at a crossing point, including:
   (a) relatively moving a first part of said tool and a cross beam sensor by said industrial robot with translational motion in an orientation so that said first part of said tool respectively interrupts said first beam and said second beam of said cross beam sensor;

(b) recording a first posture and a second posture of said industrial robot during the interruptions of said first beam and said second beam of said cross beam sensor by said first part of said tool;
(c) relatively moving a second part of said tool and said cross beam sensor by said industrial robot with translational motion in said orientation so that said second part of said tool respectively interrupts said first beam and said second beam of said cross beam sensor;
(d) recording a third posture and a fourth posture of said industrial robot during the interruptions of said first beam and said second beam of said cross beam sensor by said second part of said tool;
(e) calculating the tool orientation in consideration of said first posture, second posture, third posture and fourth posture of said industrial robot as well as said first beam direction and said second beam direction; and
(f) relatively moving said tool and said cross beam sensor by said industrial robot so that said tool centre point of said tool interrupts said crossing point of said cross beam sensor in consideration of said tool orientation and either the first and the second postures or the third and the fourth postures of said industrial robot.

2. A method for calibrating a tool centre point of a tool for an industrial robot system comprising a cross beam sensor that has a first beam and a second beam which are angled to each other with a vertex angle greater than zero and cross each other at a crossing point, including:
(a) relatively moving a first part of said tool and a cross beam sensor by said industrial robot with translational motion in an orientation so that said first part of said tool interrupts said first beam of said cross beam sensor, moves along the first beam direction from the interruption point, and interrupts said second beam of said cross beam sensor at said crossing point of said cross beam sensor;
(b) recording a second posture of said industrial robot where said first part of said tool interrupts said second beam of said cross beam sensor at said crossing point of said cross beam sensor;
(c) relatively moving a second part of said tool and said cross beam sensor by said industrial robot with translational motion in said orientation so that said second part of said tool interrupts said first/second beam of said cross beam sensor, moves along the first/second beam direction from the interruption point, and interrupts said second/first beam of said cross beam sensor at said crossing point of said cross beam sensor;
(d) recording a fourth posture of said industrial robot where said second part of said tool interrupts said second beam of said cross beam sensor at said crossing point of said cross beam sensor;
(e) calculating the tool orientation in consideration of said second posture and said fourth posture of said industrial robot; and
(f) relatively moving said tool and said cross beam sensor by said industrial robot so that said tool centre point of said tool interrupts said crossing point of said cross beam sensor in consideration of said tool orientation and either the second posture or the fourth posture of said industrial robot.

3. A The method according to claim 1, further including:
performing in a first round the steps (a), (b), (c), (d) and (e) where said tool assumes a first orientation of four different orientations with respect to said cross beam sensor;
repeating for a second, a third and a fourth rounds the same steps as in round 1 except for step (e) where said tool respectively assumes a second, a third and a fourth orientation of said four different orientations with respect to said cross beam sensor as regards the second, the third and the fourth rounds said tool orientation considered in step (f) is the same as that calculated by step (e);
for each of said four rounds, recording a fifth, a sixth, a seventh and an eighth posture of said industrial robot respectively during the interruptions of said crossing point of the first beam and the second beam of said cross beam sensor by said tool centre point of said tool; and
calculating the tool centre point position in consideration of the fifth, the sixth, the seventh and the eighth posture of said industrial robot;
wherein:
said tool is attached to wrist of said industrial robot; and
said cross beam sensor is fixed with respect to said industrial robot during said relative movement between said cross beam sensor and said tool.

4. The method according to claim 1, further including:
performing in a first round the steps (a), (b), (c), (d) and (e) where said tool assumes a first orientation of four different orientations with respect to said cross beam sensor;
repeating for a second, a third and a fourth rounds the same steps as in round 1 except for step (e) where said tool respectively assumes a second, a third and a fourth orientation of said four different orientations with respect to said cross beam sensor and as regards the second, the third and the fourth rounds said tool orientation considered in step (f) is the same as that calculated by step (e);
for each of said four rounds, recording a fifth, a sixth, a seventh and an eighth posture of said industrial robot respectively during the interruptions of said crossing point of the first beam and the second beam of said cross beam sensor by said tool centre point of said tool; and
calculating the tool centre point position in consideration of the fifth, the sixth, the seventh and the eighth posture of said industrial robot;
wherein:
said cross beam sensor is attached to wrist of said industrial robot;
said tool is fixed with respect to said industrial robot during said relative movement between said cross beam sensor and said tool.

5. The method according to claim 2, wherein:
said tool orientation is represented with respect to said industrial robot wrist coordinate system;
said first, second, third and fourth postures of said industrial robot are represented with respect to said industrial robot system; and
said fifth, sixth, seventh and eighth postures of said industrial robot are represented with respect to said industrial robot system.

6. The method according to claim 3, wherein:
said tool orientation is represented with respect to said industrial robot coordinate system;
said first, second, third and fourth postures of said industrial robot are represented with respect to said industrial robot system; and said fifth, sixth, seventh and eighth postures of said industrial robot are represented with respect to said industrial robot system.

7. The method according to claim 1, wherein:
the first part and the second part of said tool are separately disposed on a linear portion of said tool.

8. The method according to claim 1, wherein:
each of said first, second, third and fourth postures of said industrial robot is determined by averaging the posture of the respective one at the instant of the interruption of the beam and that at the subsequent release of the beam.

9. The method according to claim 1, wherein:
each of said first, second, third and fourth postures of said industrial robot is determined by averaging the posture of the respective one at the instant of the interruption of the beam from one side and that from the opposite side.

10. The method according to claim 1, wherein:
each of said first, second, third and fourth postures of said industrial robot is determined by averaging the posture of the respective one at the instant of release of the beam from one side and that from the opposite side.

11. The method according to claim 1, wherein:
said tool is a linear-displacement sensor.

12. The method according to claim 1, wherein:
said tool is replaced by a linear-shaped fixture that is mounted on a peripheral of said industrial robot system.

13. The method according to claim 2, wherein:
the first part and the second part of said tool are separately disposed on a linear portion of said tool.

14. The method according to claim 2, wherein:
each of said first, second, third and fourth postures of said industrial robot is determined by averaging the posture of the respective one at the instant of the interruption of the beam and that at the subsequent release of the beam.

15. The method according to claim 2, wherein:
each of said first, second, third and fourth postures of said industrial robot is determined by averaging the posture of the respective one at the instant of the interruption of the beam from one side and that from the opposite side.

16. The method according to claim 2, wherein:
each of said first, second, third and fourth postures of said industrial robot is determined by averaging the posture of the respective one at the instant of release of the beam from one side and that from the opposite side.

17. The method according to claim 2, wherein:
said tool is a linear-displacement sensor.

18. The method according to claim 2, wherein:
said tool is replaced by a linear-shaped fixture that is mounted on a peripheral of said industrial robot system.

19. The method according to claim 3, wherein:
the first part and the second part of said tool are separately disposed on a linear portion of said tool.

20. The method according to claim 3, wherein:
each of said first, second, third and fourth postures of said industrial robot is determined by averaging the posture of the respective one at the instant of the interruption of the beam and that at the subsequent release of the beam.

* * * * *